Dec. 22, 1925.
G. A. H. KELLNER
1,566,278
OCULAR MICROMETER
Filed Oct. 9, 1923
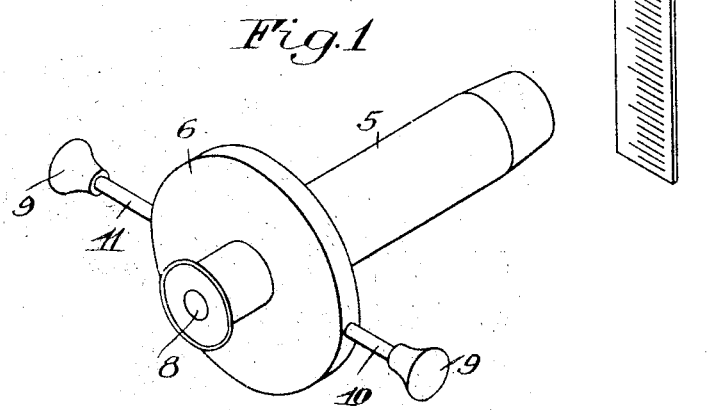
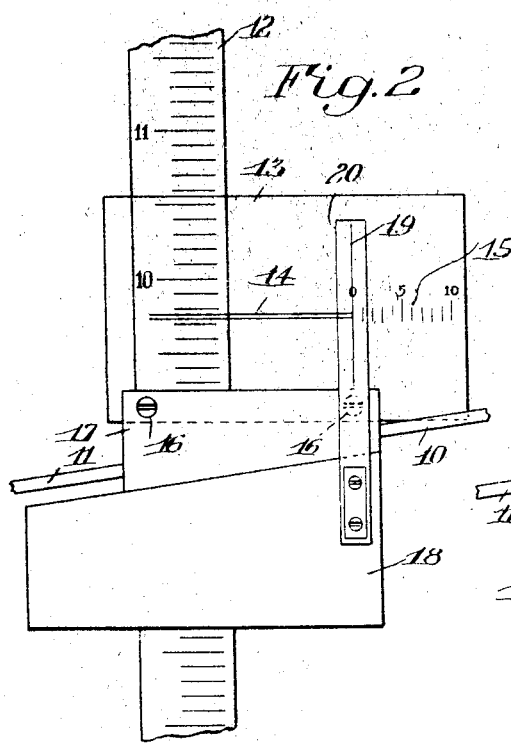
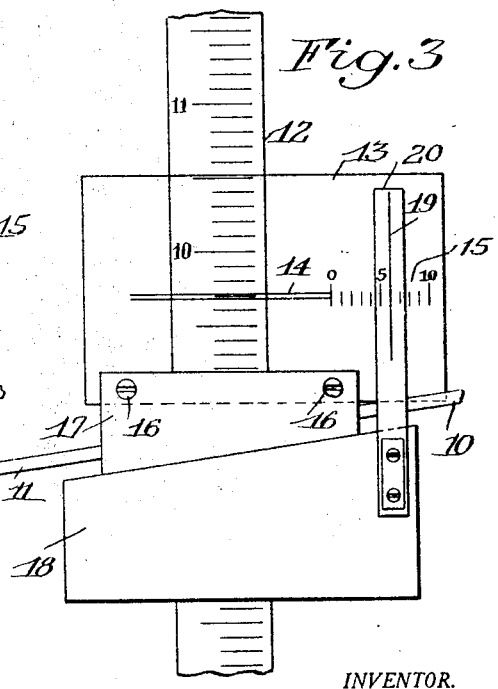
INVENTOR.
Gustav A. H. Kellner
BY
his ATTORNEY Patented Dec. 22, 1925.

1,566,278

UNITED STATES PATENT OFFICE.

GUSTAV A. H. KELLNER, OF ROCHESTER, NEW YORK, ASSIGNOR TO BAUSCH & LOMB OPTICAL CO., OF ROCHESTER, NEW YORK, A CORPORATION OF NEW YORK.

OCULAR MICROMETER.

Application filed October 9, 1923. Serial No. 667,492.

*To all whom it may concern:*

Be it known that I, GUSTAV A. H. KELLNER, a citizen of the United States, residing at Rochester, in the county of Monroe and State of New York, have invented certain new and useful Improvements in Ocular Micrometers; and I do hereby declare the following to be a full, clear, and exact description of the same, reference being had to the accompanying drawings, forming a part of this specification, and to the reference numerals marked thereon.

This invention relates to measuring instruments and more particularly to the variety known as ocular micrometers, having for its object the provision of a simple and efficient instrument of this character capable of being adjusted and read rapidly, conveniently and with accuracy, and at the same time having a construction which may be produced at a relatively low cost.

To these and other ends the invention resides in certain improvements and combinations of parts all as will be hereinafter more fully described, the novel features being pointed out in the claims at the end of the specification.

In the drawing:

Fig. 1 is a perspective view of an ocular micrometer embodying the present invention together with a scale to be read thereby.

Fig. 2 is an enlarged view of the operating parts with the casing removed, showing the same in initial position for taking a reading on the scale and Fig. 3 is a similar view showing the parts as finally adjusted to give the complete reading.

Similar reference numerals throughout the several views indicate the same parts.

In the embodiment of the invention herein disclosed by way of illustration of the principles involved, there is employed a suitable optical system for forming an image of the scale to be read, or other part to be observed such, for example, as commonly used in reading micrometers or telescopes. This optical system is contained within a tube 5, Fig. 1, having an eyepiece 8, and being of well known construction, requires no further description. Tube 5 is provided with a box or casing 6 within which the micrometer means is housed and in the plane of which the image of the scale 7 is formed. At 9 are finger pieces fixed on the outer ends of rods 10 and 11 for adjusting the micrometer means, as more particularly described hereafter. The casing 6 is shown in the present instance as generally circular in shape, but it is to be understood, of course, that the casing may have any suitable form adapted to particular applications of the invention and the casing and tube may be supported in any suitable known manner for reading the scale or other part to be observed, as well understood in the art.

The micrometer measuring means for subdividing the graduations of the scale to be read comprises, preferably, a subdividing scale and cooperating index adjustable with reference to the image of the scale to be read for subdividing the graduations thereof and an advantageous wedge means for quickly and accurately making such adjustments. Referring more particularly to Fig. 2, there is represented at 12 the image of the scale to be read formed within the casing by the optical means. At 13 in the plane of the image is a plate of glass or other transparent material provided at 14 with one or more index lines extending parallel with the graduations of the scale image for adjustment longitudinally of the latter into registry with the graduations by movement of the plate as hereafter described. At 15, preferably in continuation of the index 14 and at one side of the scale image is a subdividing scale graduated to afford the desired subdivision of the units of the scale to be read. The plate or member 13 is preferably fixed as by means of screws 16 on a wedge part 17. The latter has an inclined lower edge retained by any suitable means in sliding engagement with the inclined upper edge of a stationary wedge part 18 fixed in any suitable manner in casing 6. It is apparent from this construction that by sliding the movable wedge part 17 on the stationary part 18, plate 13 is given an oblique movement having both a vertical and a horizontal component. The vertical component of this movement serves for adjusting index 14 over the scale image for reading the same, while the horizontal component shifts the subdividing scale 15 relative to a fixed index line 19 preferably marked on a strip of glass or other transparent material 20 projecting upwardly from a stationary support, in the present instance the wedge part 18. The adjusting rods 10 and 11 described above are fixed to the ends of the movable wedge part 17 and extend through openings in the casing 6 as shown.

The image of the scale to be read, the subdividing scale 15 and the indices 14 and 19 lie substantially in a common plane. The length of the subdividing scale 15 is such that adjustment of the movable wedge for the full length of this scale produces a movement of index 14 over one of the unit divisions of the scale to be read. Preferably index 14 consists of two adjacent parallel lines as shown, which have been found convenient for obtaining a quick and accurate setting.

It is apparent from the above description that the movable wedge may be adjusted by means of finger pieces 9 to bring the zero of the subdividing scale 15 into registry with the cooperating index 19 as shown in Fig. 2. Index 14 will then usually be found to lie above one of the graduation marks of the image of the scale to be read. The movable wedge is then adjusted toward the left and the index mark 14 thereby lowered until it coincides with the next lower graduation of the main scale, as shown in Fig. 3. Such adjustment moves the subdividing scale 15 so that its index 19 indicates on this scale the reading for the subdivision. Thus as shown in the drawing, the main scale reading is 9.7 and the subdivision reading 0.06 so that the complete reading is 9.76. The reading may of course, be carried to further decimal places by further subdivision of the scales. There is thus provided a construction of a relatively simple character comprising but few parts which may be readily manufactured at a comparatively low cost as no great precision in manufacturing methods is required. The wedge adjusting means is quickly set and with a high degree of accuracy, and the complete reading may be made at once with one position of the eye. There is no superposing of scales as in some types of instruments in common use, the indicia being so arranged and of such a character as to be easily and quickly read.

I claim as my invention:

1. In an ocular micrometer, the combination with optical means forming an image of a scale to be read, of wedge parts movable one on the other, one of said parts having an index mark and the other a cooperating subdividing scale, and an index mark on the movable one of said parts adjustable over the image of the scale to be read.

2. In an ocular micrometer, the combination with optical means forming an image of a scale to be read, of a movable member having an index for registry with the graduations of said scale image, a fixed member, one of said members having a subdividing scale and the other a cooperating index, and wedge parts slidable linearly one upon another for moving said movable member.

3. In an ocular micrometer, the combination with a casing and optical means forming in said casing an image of the scale to be read, of a wedge part fixed in said casing, a wedge part slidable on said fixed part, one of said parts having an index mark and the other a cooperating subdividing scale, and an index mark on said slidable wedge part adjustable into registry with the image of the graduations of the scale to be read for indicating subdivisions thereof on said subdividing scale.

4. In an ocular micrometer, the combination with optical means forming an image of a scale to be read, of a fixed wedge part, a wedge part slidable linearly on said fixed part, an index mark on said fixed part, a subdividing scale on said slidable part cooperating with said index, and an index on said slidable part adjustable into registry with the graduations of the scale to be read in said image for indicating subdivisions thereof on said subdividing scale.

5. In an ocular micrometer, the combination with optical means forming an image of a scale to be read, of a plate of transparent material marked with an index for cooperation with the graduations of said scale image and also with a subdividing scale, a fixed index cooperating with said subdividing scale, and wedge parts slidable linearly one upon another for moving said plate.

6. In an ocular micrometer, the combination with a casing and optical means forming in said casing an image of the scale to be read, of a glass plate in said casing movable substantially in the plane of said image and marked with an index cooperating with the graduations of said scale image and also with a subdividing scale, a fixed member in said casing having an index cooperating with said subdividing scale substantially in said plane, and wedge parts adapted to slide one upon another for moving said plate.

7. In an ocular micrometer, the combination with a casing and optical means forming in said casing an image of the scale to be read, of a wedge part fixed in said casing, a wedge part slidable on said fixed part, a glass plate on said slidable part marked with an index cooperating with the graduations of said scale image and with a subdividing scale, a member on said fixed part marked with an index cooperating with said subdividing scale, and manually operable means outside said casing for adjusting said slidable wedge part.

GUSTAV A. H. KELLNER.